US012761946B1

(12) United States Patent
Kom et al.

(10) Patent No.: US 12,761,946 B1
(45) Date of Patent: Oct. 13, 2026

(54) METHOD AND SYSTEM OF AUDITING TRANSACTIONS ON A BLOCKCHAIN

(71) Applicant: Core Scientific Operating Company, Bellevue, WA (US)

(72) Inventors: Lawrence Kom, Redmond, WA (US); Thomas Middleton Rutledge Fuller, Seattle, WA (US)

(73) Assignee: Core Scientific, Inc., Austin, TX (US)

( * ) Notice: Subject to any disclaimer, the term of this patent is extended or adjusted under 35 U.S.C. 154(b) by 642 days.

(21) Appl. No.: 17/744,017

(22) Filed: May 13, 2022

Related U.S. Application Data

(60) Provisional application No. 63/187,992, filed on May 13, 2021.

(51) Int. Cl.

| | |
|---|---|
| ***G06F 9/48*** | (2006.01) |
| ***G06Q 20/40*** | (2012.01) |
| ***H04L 9/00*** | (2022.01) |
| ***H04L 9/06*** | (2006.01) |
| ***H04L 9/32*** | (2006.01) |

(52) U.S. Cl.
CPC ............. *G06F 9/48* (2013.01); *G06Q 20/401* (2013.01); *H04L 9/0637* (2013.01); *H04L 9/3236* (2013.01); *H04L 9/50* (2022.05)

(58) Field of Classification Search
CPC .... G06F 9/48; G06Q 20/401; G06Q 20/3823; G06Q 20/405; G06Q 2220/00; G06Q 20/223; H04L 9/0637; H04L 9/3236; H04L 63/0428; H04L 9/50
See application file for complete search history.

(56) References Cited

U.S. PATENT DOCUMENTS

| | | | | |
|---|---|---|---|---|
| 10,785,035 | B1 * | 9/2020 | Lv | G06F 16/2379 |
| 10,965,448 | B1 * | 3/2021 | Raman | H04L 67/108 |
| 2018/0343175 | A1 * | 11/2018 | Bathen | G06F 16/1834 |
| 2019/0156336 | A1 * | 5/2019 | Kasthuri | G06Q 20/065 |
| 2019/0288833 | A1 * | 9/2019 | Nelms | H04L 9/3239 |
| 2020/0012579 | A1 * | 1/2020 | Anokhin | G06Q 20/02 |
| 2021/0203482 | A1 * | 7/2021 | Li | H04L 9/3239 |
| 2023/0344658 | A1 * | 10/2023 | Davies | G06Q 20/223 |

* cited by examiner

*Primary Examiner* — Jorge A Chu Joy-Davila
(74) *Attorney, Agent, or Firm* — Fishman Stewart PLLC

(57) ABSTRACT

A method of operating computers may include providing a computing task from a pool computer to a computer, operating the computer to generate an output corresponding to the computing task, auditing, via an intermediate computer, the output, and/or providing a final output to an output computer. A computing system may include a pool computer, an intermediate computer, and/or a plurality of computers. The plurality of computers may be configured to conduct computing tasks received from the pool computer and/or to generate a respective output corresponding to the computing tasks. The intermediate computer may be configured to audit the outputs prior to the outputs being provided to an output computer.

20 Claims, 2 Drawing Sheets

METHOD AND SYSTEM OF AUDITING TRANSACTIONS ON A BLOCKCHAIN

CROSS-REFERENCE TO RELATED APPLICATION

This application claims the benefit of and priority to U.S. Provisional Patent Application Ser. No. 63/187,992, filed on May 13, 2021, the disclosure of which is hereby incorporated by reference in its entirety as though fully set forth herein

TECHNICAL FIELD

The present disclosure generally relates to computer systems and methods, including computer systems and methods that may, for example, be utilized in connection with cryptocurrency mining and cryptocurrency mining computers, which may be referred to as miners or cryptocurrency miners.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Many cryptocurrencies (e.g., Bitcoin, Litecoin) are based on a technology called blockchain, in which transactions are combined into blocks. These blocks are stored with previous blocks of earlier transactions into a ledger (the "blockchain") and rendered immutable (e.g., practically unmodifiable) by including a hash. The hash is a number that is calculated based on the blocks and that meets the blockchain's particular criteria. Once the block and hash are confirmed by the cryptocurrency network, they are added to the blockchain. The hashes can be used to verify whether any of the prior transactions or blocks on the blockchain have been changed or tampered with. This creates an immutable ledger of transactions and allows the cryptocurrency network to guard against someone trying to add false information to the blockchain and/or to double spend a digital coin.

Cryptocurrency networks generally consist of many participants that repeatedly attempt to be the first to calculate a hash meeting the blockchain network's requirements. They receive a reward (e.g., a coin reward or transaction fee reward) that motivates them to continue participating (mining).

Many blockchain networks require computationally difficult problems to be solved as part of the hash calculation. The difficult problem requires a solution that is a piece of data which is difficult (costly, time-consuming) to produce but easy for others to verify and which satisfies certain requirements. This is often called "proof of work". A proof of work (PoW) system (or protocol, or function) is a consensus mechanism. It deters denial of service attacks and other service abuses such as spam on a network by requiring some work from the service requester, usually meaning processing time by a computer.

Participants in the network typically operate computers called mining rigs or miners. Because of the difficulty involved and the amount of computation required, the miners are typically configured with specialized components that improve the speed at which hashes or other calculations required for the blockchain network are performed.

Examples of specialized components include application specific integrated circuits (ASICs), field programmable gate arrays (FPGA), graphics processing units (GPUs), and accelerated processing unit (APUs).

Miners are often run for long periods of time at high frequencies that generate large amounts of heat. Even with cooling (e.g., high speed fans), the heat and constant operations can negatively impact the reliability and longevity of the components in the miner. ASIC miners, for example, often have large numbers of hashing chips (e.g., 100's) that are more likely to fail as temperatures rise.

Many participants in blockchain networks operate large numbers (e.g., 100's, 1000's or more) of different computers/miners (e.g., different generations of miners from one manufacturer or different manufacturers) concurrently. These large numbers of miners can be difficult to manage. In some configurations, miners and/or other computers participating in blockchain computations/transactions may utilize communication methods and/or protocols that may result in inefficient operation.

There is a desire for solutions/options that minimize or eliminate one or more challenges or shortcomings of computer systems and methods. The foregoing discussion is intended only to illustrate examples of the present field and is not a disavowal of scope.

SUMMARY

In example embodiments, a method of operating computers may include providing a computing task from a pool computer to a computer, operating the computer to generate an output corresponding to the computing task, auditing, via an intermediate computer, the output, and/or providing a final output to an output computer.

With illustrative embodiments, a computing system may include a pool computer, an intermediate computer, and/or a plurality of computers. The plurality of computers may be configured to conduct computing tasks received from the pool computer and/or to generate a respective output corresponding to the computing tasks. The intermediate computer may be configured to audit the respective outputs prior to the outputs being provided to an output computer.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1:
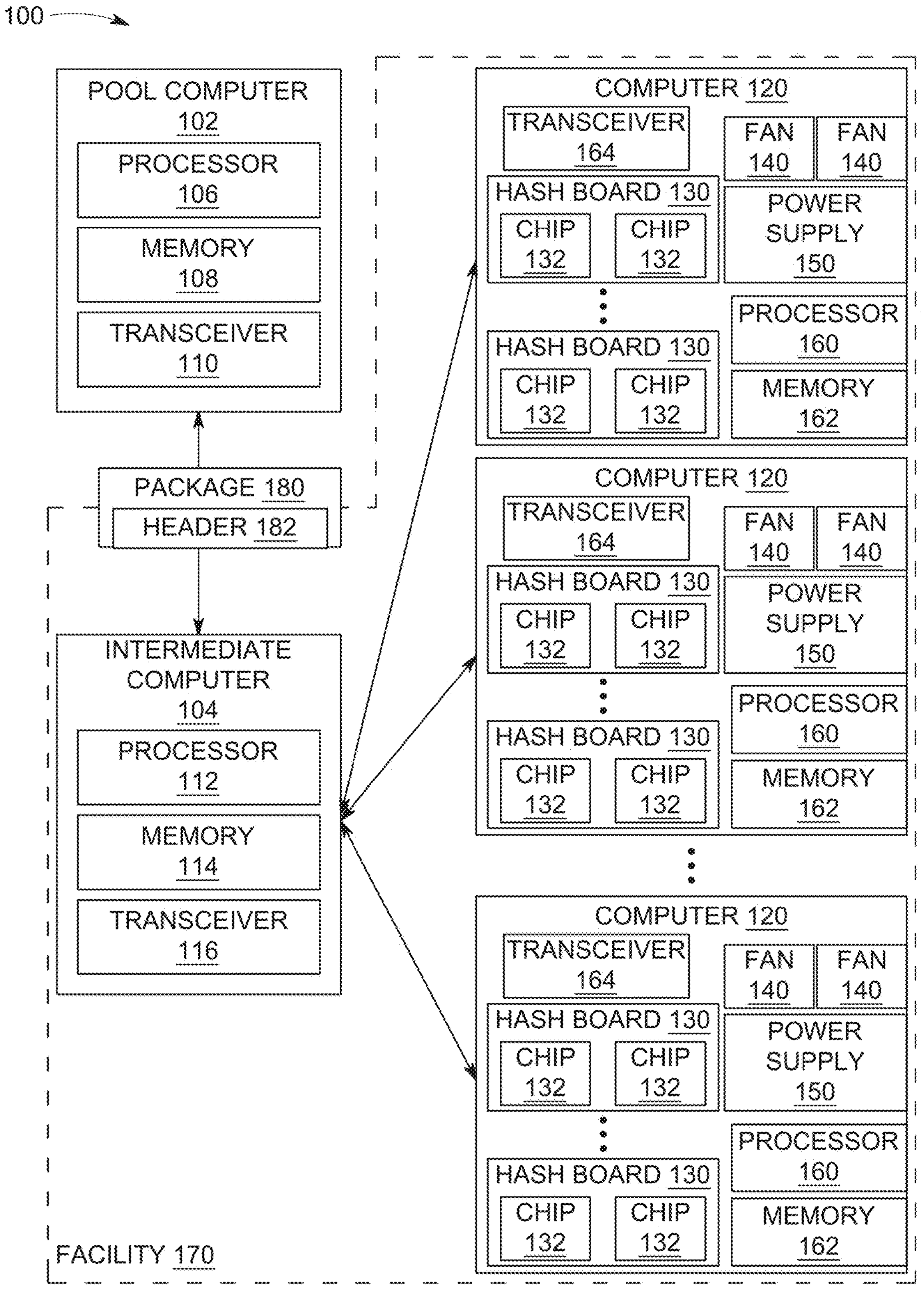
FIG. 1 is schematic view generally illustrating an example embodiment of a computing system according to an exemplary teaching of the present disclosure.

In embodiments, such as generally illustrated in FIG. 1, a computer system 100 may include a pool computer 102, an intermediate computer 104, and/or one or more computers 120 (e.g., miners, work computers, etc.). Pool computer 102 may include a processor 106, a memory 108, and/or a transceiver 110 (e.g., a network interface). Pool computer 102 may, in some circumstances be referred to as a pool manager. Intermediate computer 104 may include a processor 112, a memory 114, and/or a transceiver 116 (e.g., a network interface).

With embodiments, a computer 120 may be configured to perform compute tasks, such as compute tasks that may be utilized in connection with a blockchain and/or cryptocurrency mining. For example, a computer 120 may include one or more compute boards like hash boards 130. Processor 160, which may be configured as a controller, may handle communication external to computer 120 (e.g., via a transceiver 164), distribute compute tasks to hash boards 130, and/or receive results from computations from hash boards 130. Hash boards 130 may include one or more computing chips 132. Processor 160 may also be configured to control settings of computer 120 such as setting speeds of fans 140, chip voltage, and/or chip frequency. Some of these settings may be set by processor 160 by communicating with power supply 150 and some of these may be set by processor 160 by communicating with components directly on hash boards 130. Operating instructions for processor 160 may, for example, be stored on a memory 162. A power supply 150 may provide power to some or all components of a computer 120, such as a hash board 130, a fan 140, a processor 160, a memory 162, and/or a transceiver 164.

In one example embodiment, computing chips 132 may include fixed-function application specific integrated circuits (ASICs) that are optimized for efficiently calculating hashes (e.g., SHA256), an operation that may be useful for mining cryptocurrencies like Bitcoin that are based on proof of work (POW). In other embodiments, computing chips 132 may, additionally or alternatively, include graphic processing units (GPUs) or field programmable gate arrays (FPGAs), and processor 160 may also be configured to provide programming information for these more configurable devices (e.g., OpenCL for GPUs and VHDL or Verilog for FPGAs). In some embodiments with FPGAs or GPUs, computers 120 may be configured to perform other types of compute operations, such as image processing, such as part of a machine learning neural network.

Computers 120 need not be of the same type, and in many embodiments may comprise groups of devices of different model types from different manufactures. Dissimilar models provided by disparate manufacturers may be controlled in different ways. Some components of computers 120 may include voltage regulators, buck controllers, and/or MOSFETs, among others, which may be controlled individually by intermediate computer 104 (and/or a separate managing computer), such as via respective processors/controllers 160 that may receive instructions from intermediate computer 104.

With illustrative embodiments, pool computer 102 may include and/or may distribute a plurality of compute tasks. Pool computer 102 may use a communication protocol that may standardize the manner in which information is distributed and/or received by pool computer 102. The communication protocol may, for example and without limitation, include a Stratum protocol.

In example embodiments, computer 120 may request compute tasks from pool computer 102 and, in response, pool computer 102 may provide a package of information 180 (e.g., an electronic package) with an identifying header 182. Computer 120 may receive the package 180 and utilize information therefrom, including information from the header 182, to conduct compute tasks and generate output information (e.g., hashes, shares, etc.) that may, for example, be used for discovering a new block in a blockchain. An output computer, such as pool computer 102, may receive the output information, verify the output information, and/or, provide a reward to an account associated with computer 120 for the amount of work done to generate the output information, such as if the output information is verified. If the verification fails, such as if a corresponding block is already discovered when the output information is received and/or a difficulty of the tasks completed to generate the output information does not match the header information and/or information from the electronic package 180, the output computer may reject the output information. If computer 120 rejects output information, the output computer may impose a penalty for computer 120 and/or the account associated therewith.

In illustrative embodiments, intermediate computer 104 may be configured to manage and/or control, at least in part, communications between computer 120 and an output computer (e.g., pool computer 102). Intermediate computer 104 may, for example, audit output information from computer 120 prior to the output information being provided to the output computer. Output information that passes the audit may be provided to the output computer and may be referred to the final output information (e.g., intermediate computer 104 may provide/generate the final output information).

With example embodiments, auditing output information may include intermediate computer 104 obtaining header 182 of the electronic package 180 associated with the output information. Intermediate computer 104 may obtain the header 182 initially (e.g., at or about the same time as computer 120), may obtain the header 182 from computer 120, and/or may obtain the header 182 from pool computer 102. Intermediate computer 104 may parse header 182 to obtain the header information. Parsing of header 182 by intermediate computer 104 may be conducted in the same or a similar manner as computer 120 (e.g., intermediate computer 104 may simulate/imitate computer 120). Additionally or alternatively, intermediate computer 104 may utilize code written in a low-level programming language, such as C++, for example, to parse the header.

In illustrative embodiments, auditing output information may include utilizing header information that may be obtained from parsing header 182. For example, intermediate computer 104 may determine a difficulty level specified by header 182. Intermediate computer 104 may compare the difficulty level specified by header 182 with the difficulty associated with the output information (e.g., the difficulty of the tasks conducted to obtain the output information). If the difficulties match, intermediate computer 104 may continue auditing or, if no additional auditing steps remain, may complete the auditing process. If the difficulties do not match, intermediate computer 104 may determine that the portions of output information that have an incorrect difficulty are improper. In some cases, all portions of the output information may have an incorrect difficulty and intermediate computer 104 may determine that all of the output information is improper.

With illustrative examples, intermediate computer 104 may reject improper portions of the output information, not provide the improper output information to the output computer, prevent computer 120 from providing the improper output information, provide an instruction/recommendation to computer 120 or a management computer not to provide the improper output information to the output computer, and/or remove/exclude the improper output information and provide the remainder of the output information (if any) as the final output information to the output computer.

In example embodiments, intermediate computer 104 may be configured to determine if a block corresponding to header 182 and/or compute tasks worked on by computer 120 has been discovered. For example, intermediate computer 104 may search the blockchain for the most recently discovered block or blocks. If a corresponding block has been discovered prior to the output information being provided to the output computer, the output computer may reject the output information and/or may impose a penalty on an account associated with computer 120. In some instances, intermediate computer 104 may check for a discovered block when computer 120 generates the output information (e.g., may be an auditing step). If intermediate computer 104 determines that the corresponding block has already been found, intermediate computer 104 may reject the output information (e.g., determine that output information is improper), not provide the output information to the output computer, prevent computer 120 from providing output information, and/or provide an instruction/recommendation to computer 120 or management computer not to provide the output information to the output computer, which may prevent a penalty from being imposed.

With example embodiments, intermediate computer 104 may periodically and/or substantially continuously check for/monitor the status of the corresponding block. If intermediate computer determines that a corresponding block has been discovered while computer 120 is still in the process of generating the output information, intermediate computer 104 may send a message/instruction to computer 120 that may cause computer 120 to stop work on the tasks corresponding to that block.

In some circumstances, pool computer 102 may determine that a block has been found and notify computer 120, at least indirectly, of the discovery and/or that further work corresponding to the block will not be accepted, but there may be a delay between the discovery of the block, pool computer 102 identifying the discovery, and pool computer 102 notifying computer 120. This delay may, for example and without limitation, be about 1 to 2 seconds, which may be a significant amount time. For example and without limitation, a block may be discovered about every 13 seconds, so reducing or avoiding the delay via intermediate computer 104 providing advanced notification may result in significantly more efficient operation of computer 120. Intermediate computer 104 may monitor for the discovery of a block independently of computer 120 and/or pool computer 102, such as via monitoring the blockchain directly. Upon determining that a corresponding block has been discovered, intermediate computer 104 may notify computer 120 (e.g., before a notification is received from pool computer 102) and/or prevent output information corresponding to the discovered block from being submitted. Notifying computer 120 of the discovered block may allow computer 120 to stop work corresponding to the discovered block and transition to work for a new block, which may waste less computing resources and/or electrical power (e.g., may make computer 120 more efficient).

In some example embodiments, intermediate computer 104 may be configured to manage and/or control communications of a plurality of computers 120 with pool computer 102 (which may include multiple computers at least a subset of which act as a pool computer 102) and/or an output computer, which, at least in some configurations, may be the pool computer 102 (or a computer thereof). For example and without limitation, intermediate computer 104 may be configured to audit output information from a plurality of computers 120 (e.g., sequentially, substantially simultaneously, etc.) prior the output information being submitted to an output computer, such as pool computer 102, and check for proper difficulty and/or for discovered blocks corresponding to work being done by a plurality of computers 120 that may be working on different blocks and/or blockchains.

With some illustrative embodiments, auditing output information may include auditing a rate of work, such as a hash rate, of one or more computers 120. For example, intermediate computer 104 may monitor output information from computer 120 and determine (e.g., measure) the amount of work (e.g., number of hashes) actually produced by computer 120 over a period of time, and may determine a corresponding work rate, such as in megahash per second (M/s). Additionally or alternatively, intermediate computer 104 may determine an effective work rate, which may include determining how much work done by computer 120 is actually provided to an output computer and/or accepted by an output computer. For example, intermediate computer 104 may measure/count the number of hashes computer 120 provides for pool computer 102 and/or the number of hashes accepted by pool computer 102 and divide by the period of time to obtain an effective work rate or hash rate for computer 120. Computer 120 may determine its own work rate (e.g., internally). Intermediate computer 104 may compare the internal work rate from computer 120 with the actual work rate and/or the effective work rate. If the internal work rate is equal to or within a threshold of a measured work rate (e.g., the actual work rate and/or the effective work rate obtained via intermediate computer 104), intermediate computer 104 may determine that the internal work rate from computer 120 is accurate and/or that computer 120 has passed a work rate portion of the audit. If the internal work rate is not within a threshold of the measured work rate, intermediate computer 104 may determine that the internal work rate from computer 120 is inaccurate and/or that computer 120 has failed a work rate portion of the audit. If a computer 120 fails a work rate portion of an audit, intermediate computer 104 may, for example, add that computer 120 to a repair list.

In an illustrative embodiment, intermediate computer 104 and computers 120 may be disposed in a common/the same facility 170, such as a data center, warehouse, and/or container, among others. Pool computer 102 may be disposed inside facility 170 or, alternatively, outside of facility 170. Pool computer 102, intermediate computer 104, and/or computer(s) 120 may be separate devices (e.g., in separate housings) that may be connected to communicate with each other, such as via one or more networks (e.g., wired networks, wireless networks, etc.).

With illustrative embodiments, auditing output information from computer(s) 120 with intermediate computer 104 prior to submitting to an output computer, such as pool computer 102, may improve the operating efficiency of computer 120. For example, computer(s) 120 may not waste computing resources, time, and/or electrical power sending output information that will not be verified, and/or may stop work on a discovered block sooner. Additionally or alternatively, auditing output information via intermediate computer 104 may improve operating efficiency of the output computer, such as pool computer 102. For example, pool computer 102 may not waste computing resources, time, and/or electrical power attempting to verify improper output information (e.g., with the wrong difficulty and/or for an already discovered block).

Figure 2:
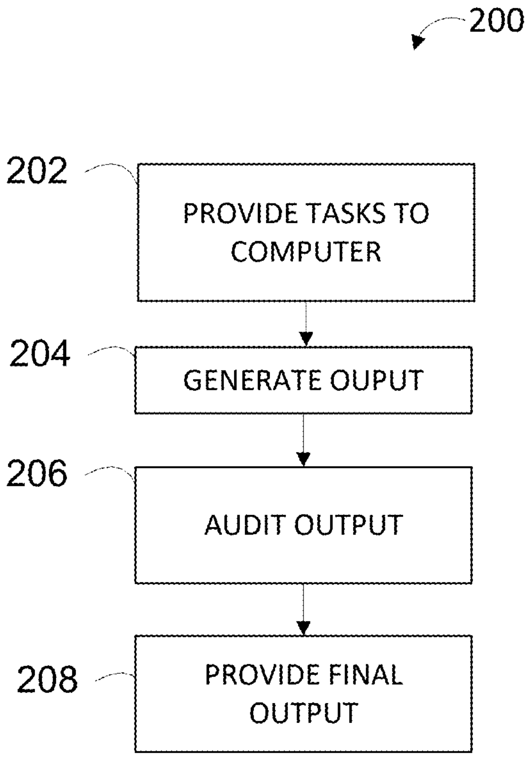
FIG. 2 is flow chart generally illustrating an example embodiment of a method of operating computers of the present disclosure.

Turning to FIG. 2, an example embodiment of a method 200 of computer operation is illustrated. Method 200 may include providing one or more computing tasks to a computer 120, such as in the form of an electronic package 180 from a pool computer 102 (block 202). The computing tasks may, for example, be utilized for discovering blocks on a blockchain. Method 200 may include operating computer 120 to generate an output corresponding to the one or more computing tasks (block 204). The output may, for example, include hashes. Method 200 may include auditing, via intermediate computer 104, the output (block 206). Auditing the output may include intermediate computer 104 parsing a header 182 associated with an electronic package 180, which may have one or more computing tasks, received from pool computer 102 to obtain header information. Auditing the output may include intermediate computer 104 monitoring communications between pool computer 102 (and/or a different output computer) and computer 120 to obtain header 182 prior to parsing. Additionally or alternatively, auditing the output may include intermediate computer 104 comparing the output with the information from header 182 (e.g., header information). The header information may include a header difficulty, the output may include an output difficulty, and comparing the output with the header information may include intermediate computer 104 comparing the header difficulty with the output difficulty. For example, intermediate computer 104 may identify portions of the output that are not consistent with the header information (e.g., that do not include the header difficulty) and remove the portions that are inconsistent with the header information to generate a final output. If the output from computer 120 is consistent with the header information, the final output may be the same as the output.

In some illustrative embodiments, auditing the output (block 206) may include intermediate computer 104 auditing a work rate of computer 120. Auditing the work rate may include intermediate computer 104 measuring an amount of work that is conducted/completed by computer 120 and provided to the output computer. The work rate may include a hashrate (e.g., hashes per second) and/or computer 120 may include one or more hash boards 130. Auditing the work rate may include intermediate computer 104 comparing an internal work rate provided/determined by computer 120 with the measured amount of work.

In example embodiments, method 200 may include providing the final output to an output computer (block 208). For example, intermediate computer 104 may provide the final output to pool computer 102, which may, at least in some cases, function as the output computer and provide electronic package 180.

Example embodiments of method 200 may increase efficiency of pool computer 102 and/or computer(s) 120, and/or method 200 may be referred to a method of increasing computer operation efficiency.

With example embodiments, intermediate computer 104 may be configured to simulate one or more functions of pool computer 102 (or a different output computer) and/or computer(s) 120. For example, auditing the output from computer(s) 120 may simulate, at least in part, how an output computer, such as pool computer 102, might verify the output. Additionally or alternatively, parsing the header 182 may simulate how computer(s) 120 might parse a header to start working on the corresponding tasks.

In examples, a computing device/computer (e.g., computers 102, 104, 120) may include an electronic controller and/or include an electronic processor, such as a programmable microprocessor and/or microcontroller. In embodiments, a computing device/computer may include, for example, an application specific integrated circuit (ASIC). A computing device/computer may include a central processing unit (CPU), a memory (e.g., a non-transitory computer-readable storage medium), and/or an input/output (I/O) interface. A computing device/computer may be configured to perform various functions, including those described in greater detail herein, with appropriate programming instructions and/or code embodied in software, hardware, and/or other medium. In example embodiments, a computing device/computer may include a plurality of controllers. In illustrative embodiments, a computing device/computer may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer/computing device, an electronic control unit (ECU), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method of operating computers, the method comprising:
- providing a computing task from a pool computer to a computer;
- operating the computer to generate an output corresponding to the computing task, wherein the generated output information is used for discovering a new block in a blockchain by the pool computer;
- auditing, via an intermediate computer, the output;
- providing a final output to an output computer; and
- wherein the intermediate computer, while the computer is generating the output, monitors, continuously and independently from the pool computer, the blockchain via a network connection distinct from communications between the pool computer and the computer for discovery of the new block and, in response to determining that the new block has already been discovered, before the pool computer notifies the computer of the discovery, instructs the computer to stop generating the output and prevents submission of the output to the output computer.

2. The method of claim 1, wherein auditing the output includes the intermediate computer parsing a header associated with the computing task received from the pool computer to obtain header information.

3. The method of claim 2, wherein auditing the output includes the intermediate computer monitoring communications between the pool computer and the computer to obtain the header prior to parsing.

4. The method of claim 2, wherein auditing the output includes the intermediate computer comparing the output with the header information.

5. The method of claim 4, wherein the header information includes a header difficulty; the output includes a difficulty; and
- comparing the output with the header information includes the intermediate computer comparing the header difficulty with the output difficulty.

6. The method of claim 4, wherein auditing the output includes removing any portions of the output that are inconsistent with the header information to generate the final output.

7. The method of claim 6, wherein providing the output to the output computer includes the intermediate computer providing the final output to the pool computer.

8. The method of claim 4, wherein the final output is the same as the output if the output is consistent with the header information.

9. The method of claim 1, wherein the intermediate computer checks for the discovered block as part of auditing the output.

10. The method of claim 1, including auditing a work rate of the computer.

11. The method of claim 10, wherein auditing the work rate includes measuring an amount of work conducted by the computer and provided to the output computer.

12. The method of claim 11, wherein the work rate includes a hashrate and the computer includes one or more hash boards; and
- wherein auditing the work rate includes comparing an internal work rate from the computer with the measured amount of work.

13. A computing system, comprising:

a pool computer;

an intermediate computer; and a plurality of computers, each computer configured to conduct computing tasks received from the pool computer and generate a respective output corresponding to the computing tasks;

wherein each generated respective output is used for discovering a new block in a blockchain by the pool computer;

wherein the intermediate computer is configured to audit the respective outputs prior to the respective outputs being provided to an output computer; and wherein the intermediate computer, while each computer is generating the respective output, monitors, continuously and independently from the pool computer and via a network connection to the blockchain, the blockchain for discovery of the new block and, in response to determining that the new block has already been discovered and before the pool computer notifies the computer of the discovery, instructs the plurality of computers to stop generating the respective outputs and prevents submission of the respective outputs to the output computer.

14. The computing system of claim 13, wherein auditing the outputs includes parsing a header associated with the computing tasks received from the pool computer to obtain header information.

15. The computing system of claim 14, wherein auditing the outputs includes comparing the outputs with the header information and removing portions of the outputs that are inconsistent with the header information to generate final outputs.

16. The computing system of claim 13, wherein the plurality of computers are configured to operate on different blocks and/or different blockchains, and the intermediate computer is further configured to audit the respective outputs and check for discovered blocks corresponding to the work being performed by the plurality of computers.

17. The computing system of claim 15, wherein the intermediate computer is configured to provide the final outputs to output computer.

18. The computing system of claim 14, wherein the intermediate computer is configured to monitor communications between the output computer and the plurality of computers to obtain the header prior to parsing.

19. The computing system of claim 13, wherein the output computer is the pool computer; the plurality of computers includes a respective one or more hash boards; and the output includes hashes.

20. The method of claim 10, wherein the intermediate computer determines an effective work rate by determining how much work done by the computer is actually provided to the output computer.

* * * * *